Nov. 3, 1942.  W. F. STREHLOW  2,301,152
TRACTOR
Filed July 14, 1941  2 Sheets-Sheet 1

Inventor
W. F. Strehlow
by
Attorney

Nov. 3, 1942.    W. F. STREHLOW    2,301,152
TRACTOR
Filed July 14, 1941    2 Sheets-Sheet 2

Inventor
W. F. Strehlow
by
Attorney

Patented Nov. 3, 1942

2,301,152

UNITED STATES PATENT OFFICE 2,301,152

TRACTOR

Walter F. Strehlow, Wauwatosa, Wis., assignor to Allis-Chalmers Manufacturing Company, Milwaukee, Wis., a corporation of Delaware Application July 14, 1941, Serial No. 402,296

3 Claims. (Cl. 180—79)

The invention relates to motor vehicles and it is concerned more specifically with an improved mechanism for transmitting steering movements to one or more steerable wheels of the vehicle.

In tractors a pair of steerable wheels, or a single steerable wheel as in tricycle type tractors, are usually mounted on a steering truck which sustains the front end of the tractor, and it is desirable that the mechanism for transmitting steering movements to such wheels or wheel be constructed to meet a number of requirements, among which are: lightness of operation to save the operator from undue fatigue; quick responsiveness to permit dodging of plants when the tractor is used for row crop cultivation and similar operations; accurate control of the steering movements of the wheels or wheel; compactness to save space for mounting implements or attachments on the tractor and to avoid interference of the mechanism with good visibility of the ground from the driver's seat or with the crop when the tractor is used for row crop work; wear protection without frequent oilings or greasings by the operator; facility of installation of the mechanism on, and of its removal from the tractor; facility of assembly and disassembly of the mechanism for inspection, adjustment and repair; simplicity of design; low manufacturing costs; and dependable operation. Generally stated, it is an object of the invention to provide a steering mechanism which meets all of these requirements.

More specifically, it is an object of the invention to provide an improved mechanism for rotating a vertically disposed steering spindle of a tractor, the improved mechanism including a steering crank which is rotatable on an axis extending transversely of the tractor, and an endwise reciprocable link at the side of the tractor for rocking the steering crank. A worm and gear unit of standard automotive design is preferably employed to reciprocate the link endwise, and the steering crank has a bevel gear connection with the vertical steering spindle. The arm of the steering crank to which the link is connected at its forward end swings about the mentioned transverse axis when the link is reciprocated endwise by operation of the worm and gear unit, and the mechanism therefore requires very little space at the side of the tractor, as compared with an arrangement in which the link is connected to a laterally extending arm of the steering spindle, or to an arm of a spur gear segment in mesh with a spur gear pinion on the steering spindle. The actuation of the steering spindle by means of the mentioned steering crank which is rotatable about an axis extending transversely of the tractor, has the advantage of saving space, at the side of the tractor, for the mounting of implements or attachments on the tractor; while permitting at the same time the use of a worm and gear unit of standard automotive design, which, due to mass production, is available at a relatively low price.

A mechanism employing a worm and gear unit, link and steering crank in the mentioned manner, as contemplated by the invention, further does not require a universal joint between a pair of rotatable shafts such as have heretofore been frequently used in tractor steering mechanisms. The elimination of the mentioned universal joint is another advantage because the flexing of such a joint during actuation of the steering mechanism tends to fatigue the operator during long periods of operation of the tractor.

As stated, the steerable wheels of a tractor are usually mounted on a front steering truck, and it is common practice to make additional use of the steering truck by supporting the radiator of the tractor thereon. For purposes of pleasing appearance and for regulating the passage of air through the radiator, the radiator is preferably arranged within a shell of more or less elaborate design which requires special manufacturing facilities; and it is desirable that the same type of shell be adaptable to different tractor models, for instance, to four-wheel and three-wheel tractors of substantially the same horsepower rating.

It is a further object of the invention to provide a tractor front assembly comprising an improved steering gear in combination with a radiator and shell of available construction, which front assembly may be used in place of another front assembly including a radiator and shell of said available construction, the radiator shell of the substitute front assembly being fitted to the steering truck without substantial alteration or modification, so that the same manufacturing facilities may be used for the radiator shells of both front assemblies.

These and other objects and advantages of the invention will be apparent from the following description of a preferred embodiment of the invention shown in the accompanying drawings. Referring to the drawings, in which like reference characters designate the same or similar parts in the several views.

Figure 1:
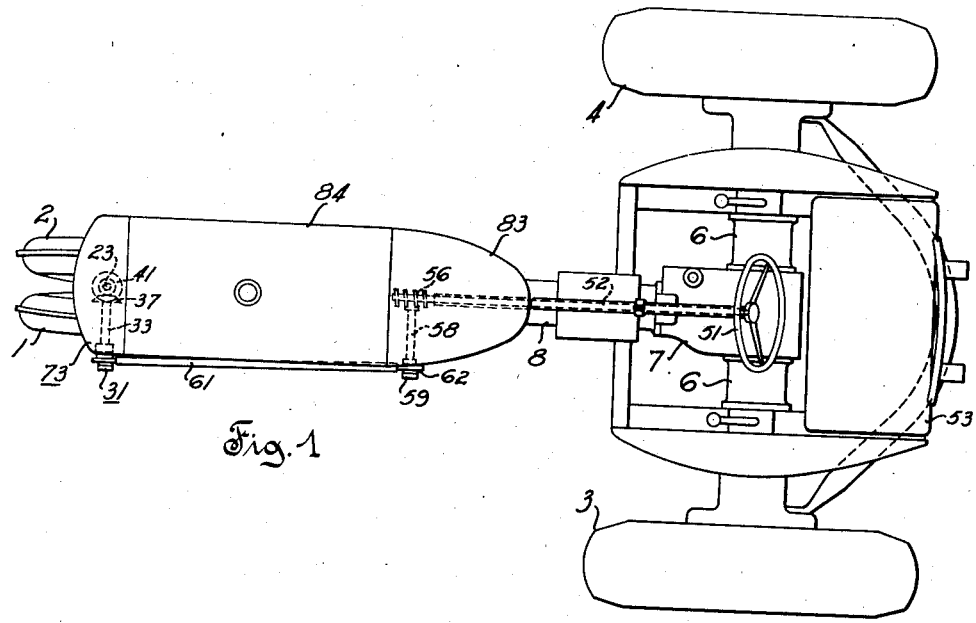
Fig. 1 is a top view of a tricycle type tractor.
Figure 2:
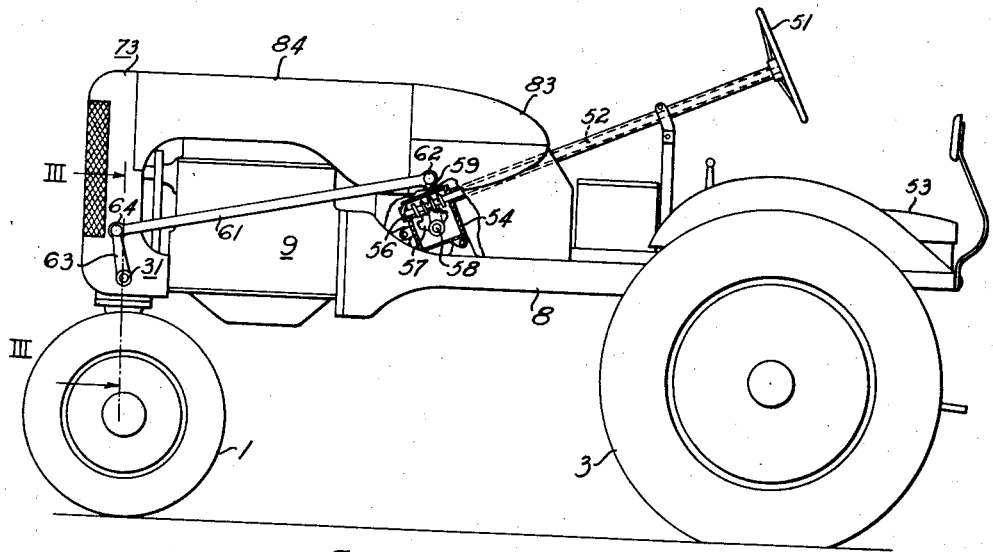
Fig. 2 is a side view of the tractor shown in Fig. 1.

As is customary in tricycle type tractors, the tractor shown in Figs. 1 and 2 has a pair of closely spaced front wheels 1 and 2, and a pair of widely spaced rear wheels 3 and 4. The rear wheels are mounted on an upwardly arched rear axle structure 6 which has a central gear casing 7 enclosing transmission and differential mechanisms. Secured to the central gear casing 7 and extending forwardly therefrom is a torque tube casing 8 which is supportingly connected at its forward end with the cylinder block of an internal combustion engine 9, suitable power transmitting mechanism being enclosed in the torque tube casing and rear axle structure for driving the rear wheels 3 and 4 of the tractor from the engine 9.

Figures 3, 4:
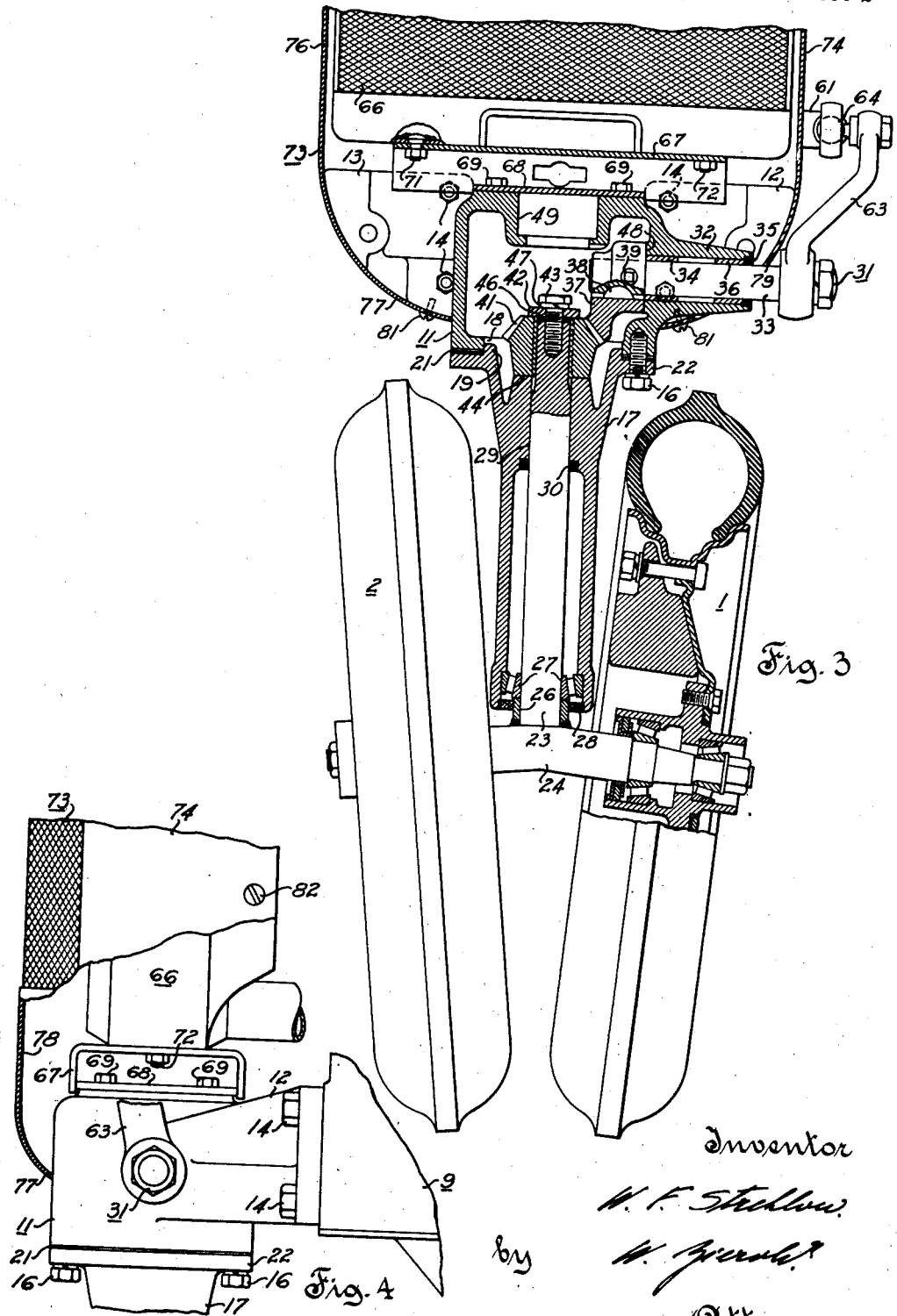
Fig. 3 is an enlarged front view, partly in section on line III—III of Fig. 2, of the front end of the tractor shown in Figs. 1 and 2.
Fig. 4 is a side view, partly in section, of part of the assembly shown in Fig. 3.

Secured to the forward end of the cylinder block of the engine 9, as shown in Figs. 3 and 4, is a housing 11 which forms the upper part of the front steering truck of the tractor. The housing 11 has vertical front, side and rear walls, and a pair of rearwardly extending brackets 12 and 13 which are integrally formed with the left and right side walls, respectively, of the housing and by means of which brackets the housing is connected to the engine 9. Each of the brackets 12 and 13 has a laterally extending wing portion with a flat vertical rear surface abutting a corresponding flat vertical front surface of the cylinder block, and a number of bolts 14 passing through holes in the wings of the brackets are threaded into the cylinder block of the engine to supportingly connect the housing 11 with the engine 9.

Secured to the bottom of the housing 11 by means of a series of bolts 16 is a vertically disposed downwardly tapering housing 17 which forms the spindle guide of the front steering truck of the tractor. The upper housing 11 has a circular bottom opening 18 and the lower housing 17 has an annular shoulder 19 at its upper end by means of which the housing 17 is piloted on the housing 11. Shims 21 for purposes of adjustment explained hereinbelow, are interposed between the housing 11 and an upper flange 22 of the housing 17, and the bolts 16 extend through holes in the flange 22 and in the shims 21, and are screwed into tapped holes of the housing 11.

A vertical steering spindle 23 extends axially through the housing 17 and terminates at its upper end within the housing 11. A cambered axle 24 is secured to the lower end of the spindle 23 by welding, and the closely spaced front wheels 1 and 2 are journaled on opposite ends of the cambered axle, the wheels being rubber tired and extending upwardly to a level below but in proximity to the upper housing 11 of the front steering truck. The welded construction of the spindle and axle assembly is the subject of a copending application Serial No. 402,918 filed on July 18, 1941, by Conrad E. Frudden.

A short sleeve 26 surrounding the spindle 23 above the axle 24 and secured thereto by welding, forms an abutment for the inner race of a conical roller bearing 27, the outer race of which is fitted into a cylindrical recess at the lower end of the housing 17. The gap between the sleeve 26 and the lower end of the housing 17 is closed by a seal 28. Another bearing for the spindle 23, in axial alinement with the roller bearing 27, is formed in an upper part of the housing 17, as shown at 29, the spindle 23 being rotatably fitted into an axial bore of the housing 17 at the upper end of the latter. A cork seal 30 at the lower end of the upper bearing 29 prevents undesirable seepage of lubricant from the upper housing past the bearing 29.

The mechanism for transmitting steering movements to the spindle 23 comprises a steering crank 31 which is journaled in a bearing boss 32 of the housing 11. The bearing boss 32 extends outwardly from the side wall of the housing 11 at the left side of the tractor, and the steering crank 31 has a shaft 33 which is mounted in an axial bore of the bearing boss, by means of bearing sleeves 34 and 36, for rotation about a horizontal axis extending transversely of the tractor. At the outer end of the bearing boss 32 the bearing for the shaft 33 is protected by a seal 35. Secured to the inner end of the shaft 33 within the housing 11 is a bevel gear segment 37 which has a hub embracing the inner end of the shaft 33, a key 38 within the hub retaining the gear segment and shaft against rotation relative to each other, and a set screw 39 on the hub retaining the gear segment 37 in axially fixed position on the shaft 33.

The gear segment 37 meshes with a bevel gear 41 which is secured to the upper end of the steering spindle 23 within the housing 11. The hub of the bevel gear 41 has internal splines which cooperate with external splines on the upper end of the spindle 23 to secure the bevel gear and spindle against rotation relative to each other, and a washer 42 on top of the bevel gear 41 is retained by a bolt 43 which is threaded into an axial tapped bore of the spindle 23. Axial movement of the spindle 23 in an upward direction relative to the housing 17 is limited by the conical roller bearing 27, and axial movement of the spindle 23 in a downward direction relative to the housing 17 is limited by engagement of the hub of the bevel gear 41 with the housing 17, a recess in the upper portion of the housing 17 affording a horizontal thrust surface 44 for cooperation with a flat end surface of the hub of the bevel gear 41. The axial play of the spindle 23 within the housing 17 is adjusted by means of shims 46 under the washer 42, the shims being of a diameter to fit into the splined bore of the bevel gear 41 and being centered on the spindle 23 by means of the bolt 43. An increase of the number of shims 46 under the washer 42 increases the axial play of the spindle 23 relative to the housing 17, while a decrease of the number of shims 46 decreases the axial play of the spindle 23, and in assembling the steering truck just enough shims 46 are used to insure free running of the roller bearing 27 without appreciable axial play of the spindle 23 relative to the housing 17. A lock washer 47 between the head of the bolt 43 and the washer 42 secures the bolt after it has been tightened to compress the shims 46.

It will be noted that the lower housing 17 of the steering truck, together with all parts mounted thereon including the bevel gear 41, may be removed as a unit from the upper housing 11 after removal of the bolts 16 which secure the upper housing 11 and the lower housing 17 together. For convenience of assembly, the bevel gear 41 is preferably mounted on the steering spindle 23 prior to the installation of said lower unit on the upper housing 11, and the proper number of shims 46 to insure free running of the roller bearing 27 without appreciable axial play of the spindle 23 are also preferably installed prior to the mounting of the lower unit on the housing 11.

The steering crank 31 together with the bevel gear segment 37 is preferably mounted on the housing 11 prior to the mounting of the lower unit, including the housing 17, on the upper housing 11. The bottom opening 18 of the housing 11 is large enough to admit the bevel gear segment 37 into the housing 11 and to afford access to the set screw 39 after the shaft 33 has been slid into the hub of the segment through the bearing boss 32. The hub of the bevel gear segment 37 has a plane end surface adjacent to a vertical inner thrust surface 48 of the housing 11, the surface 48 serving as an abutment which may be engaged by the hub of the bevel gear segment 37 to limit axial displacement of the bevel gear segment in a direction away from the axis of the bevel gear 41.

The lower unit including the housing 17 is mounted on the upper housing 11 after the steering crank 31 and bevel gear segment 37 have been installed on the latter as described hereinbefore, and in bringing the lower unit in position on the housing 11 the teeth of the bevel gear 41 are meshed with the teeth of the bevel gear segment 37. For satisfactory operation of the bevel gear connection between the spindle 23 and the steering crank 31 it is necessary that the depth of mesh of the bevel gear 41 with the bevel gear segment 37 be accurately adjusted, and this may be done by increasing or decreasing the number of shims 21 which are interposed, as mentioned hereinbefore, between the flange 22 of the housing 17 and the bottom of the upper housing 11. The thrust surface 44 on the housing 17 and the thrust surface 48 on the housing 11 limit axial displacement of the bevel gear 41 and of the bevel gear segment 37, respectively, to which displacement these gear elements are subjected due to their mutual reaction when the steering crank 31 is rotated for transmitting steering movements to the spindle 23, and the necessary number of shims 21 are used to insure the correct depth of mesh of the bevel gear 41 with the bevel gear segment 37 when the hub of the bevel gear 41 and the hub of the bevel gear segment 37 are in contact, respectively, with the thrust surfaces 44 and 48. It will be noted that the depth of mesh of the gear elements of the bevel gear connection within the housing 11 may be adjusted, by means of the shims 21, independently of axial adjustment of the spindle 23 relative to the housing 17 by means of the shims 46.

Instead of two closely spaced front wheels such as shown at 1 and 2 in the drawings, tricycle tractors are sometimes equipped with a single front wheel, and in that case the single front wheel is preferably mounted, according to accepted practice, in a fork which carries a relatively short vertical spindle at its upper end. A transverse steering crank and a bevel gear arrangement corresponding to the steering crank 31 and bevel gear arrangement described hereinbefore may be used to transmit steering movements to the relatively short steering spindle of such a wheel fork, or to any other vertical steering spindle mounted on the housing 11. A short steering spindle of a wheel fork, as mentioned, or for any other front support, may be mounted in upper and lower bearings of the housing 11, and an opening 49 for the reception of such an upper bearing is shown in Fig. 3 in alinement with the axis of the steering spindle 23.

Referring to Figs. 1 and 2, a hand wheel 51 for steering the tractor is mounted at the rear end of a rotatable steering column 52 within reach from an operator's seat 53. The forward end of the steering column 52 is mounted in the housing 54 of a worm and gear steering unit of standard automotive design, which housing is secured to the torque tube casing 8 in rear of the engine 9. A worm 56 which is part of the standard worm and gear unit is connected with the steering column 52 and meshes with a worm gear segment 57 which is also a part of the standard worm and gear unit. The segment 57 is secured to a cross shaft 58 which projects from the housing 54 at the left side of the tractor, the shaft 58 being rotatable on a horizontal axis which extends transversely of the tractor substantially parallel to the shaft 33 of the steering crank 31. The cross shaft 58 carries a steering arm 59 at its outer end, and rotation of the cross shaft 58 by operation of the hand wheel 51 is transmitted to the steering crank 31 by a link 61 which is pivotally connected to the free end of the steering arm 59 by means of a ball and socket joint 62. Secured to the outer end of the shaft 33 of the steering crank 31 is a crank arm 63 which is pivotally connected at its free end to the forward end of the link 61 by means of a ball and socket joint 64.

Figs. 1 and 2 show the front wheels 1 and 2 positioned for straight ahead travel of the tractor, and it will be noted from Fig. 2 that the crank arm 63 is so arranged as to occupy an upwardly extending position during straight ahead travel of the tractor. Similarly, the rearward steering arm 59 on the cross shaft 58 is so arranged as to occupy an upwardly extending position during straight ahead travel of the tractor. In order to steer the tractor from a straight ahead course to the left the hand wheel 51 is turned anti-clockwise, with reference to an operator on seat 53, and, as a result, the steering arm 59 and the crank arm 63 are swung forwardly from the position in which they are shown in Fig. 2. Rotation of the shaft 33 of the steering crank 31, due to forward movement of the crank arm 63, is transmitted to the steering spindle 23 through the bevel gear segment 37 and bevel gear 41 which are so meshed as to swing the wheels 1 and 2 to the left by forward swinging movement of the crank arm 63. On the other hand, turning movement of the hand wheel 51 in a clockwise direction, with reference to an operator on seat 53, causes steering movement of the wheels 1 and 2 to the right, the steering arm 59 and the crank arm 63, being swung rearwardly from the positions in which they are shown in Fig. 2, if the tractor is steered from a straight ahead course to the right. The link 61 is reciprocated endwise longitudinally of the tractor by the described manipulation of the hand wheel 51 in opposite directions.

The gear ratio between the bevel gear segment 37 and the bevel gear 41 is such that forward swinging movement of the steering arm 59, from the position in which it is shown in Fig. 2, through an angle of about 40 degrees swings the front wheels from the straight ahead position through an angle of about 65 degrees, and the crank arm 63 and the steering arm 59 are so proportioned and arranged relative to each other that the front wheels are swung through an angle of about 65 degrees to the right by rearward swinging movement of the steering arm 59, from the position in which it is shown in Fig. 2, through an angle of about 40 degrees to the rear. Due to this arrangement the front wheels 1 and 2 may safely and without substantial effort be swung from one extreme steering position to the other without moving the crank arm 63 or the steering arm 59 and the link 61 undesirably close to a dead center position. In the extreme forward or rearward positions to which the crank arm 63 may be swung for steering, its free end is spaced a substantial distance from the closest point of the periphery of the front wheel 1, so that there is no danger of the crank arm 63 or link 61 being struck by the tire of the front wheel 1 when the front wheels are swung to one or the other extreme steering position.

A radiator 66 for the internal combustion engine 9 is mounted on the front steering truck of the tractor, as best shown in Figs. 3 and 4. The radiator is seated on a support comprising a channel shaped cross bar 67 and web plate 68 secured to the flanges of the bar 67 by welding. The plate 68 rests on top of the housing 11 and is retained thereon in fixed position by bolts 69 which are threaded into the top wall of the housing 11. Bolts 71 and 72 retain the radiator 66 in an upright position on the cross bar 67.

The radiator 66 is surrounded by a sheet metal structure 73 which forms a shell for the radiator and which has a large screened front opening for the admission of air to the radiator. A shutter, not shown, is preferably arranged within the shell for regulating the passage of air through the radiator 66. As shown in Figs. 3 and 4, side walls 74 and 76 of the radiator shell are connected by a curved bottom wall 77, and a front wall 78 of relatively short height merges with the side walls 74, 76 and with the bottom wall 77. The lower part of the radiator shell overlaps the supporting brackets 12 and 13 of the upper housing 11 of the front steering truck, and the housing 11 itself extends upwardly into the radiator shell through a suitable cutout in the bottom wall 77 of the shell. A side opening 79 in the lower part of the shell affords a passage for the shaft 33 of the steering crank 31 therethrough. The shell is secured to suitable lugs of the brackets 12 and 13 by means of screws 81, and the side walls 74 and 76 of the shell are connected with side portions of the radiator 66 by a series of screw connections 82, one of which is shown in Fig. 4.

The crank arm 63 of the steering crank 31 is offset outwardly as shown in Fig. 3 and spaced laterally from the side wall 74 of the radiator shell to provide clearance for the ball and socket joint 64 by which the link 61 is connected to the crank arm 63, and which ball and socket joint is arranged at the inner side of the crank arm 63. The crank arm 63 may therefore be moved back and forth about the axis of the shaft 33 through a relatively large range of swinging movement without interference with the radiator and its shell. The link 61 extends longitudinally of the tractor along the engine 9, and relatively little space at the side of the tractor is required for operation of the link 61 and of the crank arm 63, since the latter swings in a vertical plane which extends longitudinally of the tractor at the left side of the latter. The arrangement of the crank arm 63 and the link 61 at the side of the tractor has been found not to interfere objectionably with the mounting of attachments or implements on the tractor or with convenient visibility of the ground in proximity to the tractor from the operator's seat 53.

The tractor front assembly herein disclosed is particularly adapted for use in providing a tricycle type tractor as a companion to a four-wheel type tractor which has a number of parts in common with the tricycle type tractor shown herein, such as the engine 9, radiator 66, torque tube casing 8, gear casing 7 and enclosed mechanism, the operator's seat 53 and its mounting, the fuel tank 83 and its mounting, the engine hood 84, and other parts. Such a companion four-wheel type tractor is shown, for instance, in application Serial No. 274,164, filed May 17, 1939, now Patent No. 2,254,358, dated September 2, 1941, C. E. Frudden and W. F. Strehlow, Tractor. In providing the present tricycle type tractor and the mentioned companion four-wheel type tractor, it is also possible to utilize the same set of dies for making the radiator shell 73; this shell being the same as used in the companion four-wheel type tractor, except that the shell as used in the tricycle type tractor has the mentioned cutout in the bottom wall 77 to admit an upper part of the front steering truck, and the mentioned side opening 79 for the shaft 33 of the steering crank 31, whereas the shell as used in the companion four-wheel type tractor is devoid of such bottom cutout and side opening. The dies for making the radiator shell represent a substantial investment in manufacturing facilities, and the steering mechanism disclosed herein has an appreciable advantage from a manufacturing standpoint in that its use requires no change of the radiator shell of the companion four-wheel tractor, except for the mentioned minor alterations at the lower part of the shell, which may be made at a relatively low cost.

While in the foregoing a preferred embodiment of the invention has been described in detail with reference to the drawings, it should be understood that it is not intended to limit the invention to the details of construction herein shown and described for various modifications within the scope of the appended claims may occur to persons skilled in the art.

It is claimed and desired to secure by Letters Patent:

1. In a tractor having a forward engine unit, a housing forming part of a steering truck supportingly connected with said engine unit, a steering spindle having a portion within said housing on an upright axis, a steering crank having a shaft portion extending transversely of the tractor through a wall portion of said housing at one side of the tractor and a crank arm at said one side of the tractor outside of said housing, a bevel gear connection between said spindle and shaft within said housing, means associated with said housing for rotatably supporting said spindle and shaft and for preventing axial displacement of said spindle and shaft due to the reaction of the gear elements of said bevel gear connection, and actuating means for said steering crank including an endwise reciprocable link at said one side of the tractor extending longitudinally of the latter and pivotally connected at its forward end to the free end of said crank arm.

2. In a tractor, a forward power plant including an internal combustion engine and a radiator in front of said engine, a housing supportingly connected with said engine and underlying said radiator, a steering spindle having a portion within said housing on an upright axis ahead of said engine, a steering crank having a shaft portion extending transversely of the tractor through a wall portion of said housing at one side of the tractor, a bevel gear connection between said spindle and shaft within said housing, said steering crank having a crank arm at said one side of the tractor outside of said housing arranged to occupy an upwardly extending position during straight ahead travel of the tractor and being spaced laterally from said radiator to permit unobstructed fore and aft swinging movement of said crank arm for steering the tractor to the right and left, and actuating means for said steering crank including an endwise reciprocable link at said one side of the tractor extending longitudinally of the latter along said engine and pivotally connected at its forward end to the free end of said crank arm.

3. In a tractor, a forward power plant including an internal combustion engine and a radiator in front of said engine, a housing supportingly connected with said engine and underlying said radiator, a shell for said radiator having lower portions laterally overlying said housing, a steering spindle having a portion within said housing on an upright axis ahead of said engine, a steering crank having a shaft portion extending transversely of the tractor through a wall portion of said housing and through one of said lower portions of said shell at one side of the tractor, a bevel gear connection between said spindle and shaft within said housing, said steering crank having a crank arm at said one side of the tractor outside of said radiator shell arranged to occupy an upwardly extending position laterally of said radiator shell during straight ahead travel of the tractor and being spaced laterally from said radiator shell to permit unobstructed fore and aft swinging movement of said crank arm for steering the tractor to the right and left, and actuating means for said steering crank including an endwise reciprocable link at said one side of the tractor extending longitudinally of the latter along said engine and pivotally connected at its forward end to the free end of said crank arm.

WALTER F. STREHLOW.